US009537895B2

(12) United States Patent
Zaitsev

(10) Patent No.: US 9,537,895 B2
(45) Date of Patent: Jan. 3, 2017

(54) SYSTEM AND METHOD FOR SECURING USE OF A PORTABLE DRIVE WITH A COMPUTER NETWORK

(71) Applicant: Kaspersky Lab ZAO, Moscow (RU)

(72) Inventor: Oleg V. Zaitsev, Smolensk (RU)

(73) Assignee: AO KASPERSKY LAB, Moscow (RU)

( * ) Notice: Subject to any disclaimer, the term of this patent is extended or adjusted under 35 U.S.C. 154(b) by 0 days.

(21) Appl. No.: 14/555,052

(22) Filed: Nov. 26, 2014

(65) Prior Publication Data
US 2016/0036859 A1 Feb. 4, 2016

(30) Foreign Application Priority Data

Aug. 1, 2014 (RU) ................. 2014131819

(51) Int. Cl.
H04L 29/00 (2006.01)
H04L 29/06 (2006.01)
(Continued)

(52) U.S. Cl.
CPC ............ H04L 63/20 (2013.01); G06F 21/62 (2013.01); G06F 21/6218 (2013.01);
(Continued)

(58) Field of Classification Search
CPC .. H04L 63/10; G06F 21/06; G06F 2221/2113; G06F 2221/2141
(Continued)

(56) References Cited

U.S. PATENT DOCUMENTS 7,606,801 B2 10/2009 Faitelson et al.
7,702,642 B1 4/2010 Wolfman et al.
(Continued)

FOREIGN PATENT DOCUMENTS

EP 2450819 5/2012
EP 2156610 10/2012
(Continued)

OTHER PUBLICATIONS

European Search Report for European Application Application No. EP15163366 date mailed Nov. 27, 2015.
(Continued)

Primary Examiner — Madhuri Herzog
(74) Attorney, Agent, or Firm — Patterson Thuente Pedersen, P.A.

(57) ABSTRACT

Solution for autonomously securing the use of a portable drive with a computer network. A data store is written and maintained that contains entries corresponding to a plurality of portable drives initialized for use with the computer network, each entry corresponding to at least one identifiable drive. Events are monitored as they occur on the computer network involving use of each of the plurality of portable drives. Predefined security policy determination criteria is applied, which can include drive mobility assessment criteria and drive content sensitivity criteria, to determine a drive-specific security policy for each one of the plurality of portable drives. A set of at least one policy enforcement action is executed that corresponds to a determined drive-specific security policy in response to detected usage activity for each one of the plurality of portable drives.

21 Claims, 4 Drawing Sheets

(51) Int. Cl.
  *G06F 21/62* (2013.01)
  *G06F 21/78* (2013.01)
(52) U.S. Cl.
  CPC ............ *G06F 21/78* (2013.01); *H04L 63/101* (2013.01); *H04L 63/107* (2013.01); *G06F 2221/2141* (2013.01)
(58) Field of Classification Search
  USPC .................................. 726/1–4, 16–21, 26–30
  See application file for complete search history.

(56) References Cited

U.S. PATENT DOCUMENTS

| | | | |
|---|---|---|---|
| 8,340,633 B1* | 12/2012 | Rege et al. | .................... 455/406 |
| 8,341,717 B1 | 12/2012 | Delker et al. | |
| 8,484,701 B2 | 7/2013 | Murphy | |
| 8,495,385 B2 | 7/2013 | Idani et al. | |
| 8,856,918 B1* | 10/2014 | Efstathopoulos et al. | ...... 726/19 |
| 9,027,076 B2* | 5/2015 | Roach et al. | ...................... 726/1 |
| 2003/0220765 A1 | 11/2003 | Overy et al. | |
| 2004/0117310 A1 | 6/2004 | Mendez et al. | |
| 2005/0125673 A1* | 6/2005 | Cheng | .................... G06F 21/32 713/182 |
| 2005/0216466 A1 | 9/2005 | Miyamoto et al. | |
| 2005/0229247 A1 | 10/2005 | Ishidera | |
| 2005/0238175 A1 | 10/2005 | Plotkin et al. | |
| 2005/0246494 A1 | 11/2005 | Leon et al. | |
| 2006/0120526 A1* | 6/2006 | Boucher et al. | .............. 380/247 |
| 2008/0112300 A1 | 5/2008 | Kumhyr et al. | |
| 2009/0222907 A1 | 9/2009 | Guichard | |
| 2010/0095349 A1 | 4/2010 | Motoyama | |
| 2010/0125891 A1 | 5/2010 | Baskaran | |
| 2010/0161878 A1 | 6/2010 | Chang | |
| 2011/0022849 A1* | 1/2011 | Berengoltz | ............. G06F 21/62 713/189 |
| 2011/0231672 A1 | 9/2011 | Idani et al. | |
| 2011/0258303 A1 | 10/2011 | Nath et al. | |
| 2012/0121090 A1 | 5/2012 | Haynes | |
| 2012/0239566 A1 | 9/2012 | Everett | |
| 2013/0007245 A1 | 1/2013 | Malik et al. | |
| 2013/0081104 A1* | 3/2013 | Jung et al. | ........................ 726/1 |
| 2013/0290523 A1 | 10/2013 | Komatsuzaki et al. | |
| 2014/0013391 A1 | 1/2014 | Murphy | |
| 2014/0148140 A1* | 5/2014 | Ahn et al. | ..................... 455/418 |
| 2015/0058624 A1* | 2/2015 | Borisov | ................. H04L 63/20 713/168 |

FOREIGN PATENT DOCUMENTS

| | | |
|---|---|---|
| JP | 2005184368 | 7/2005 |
| JP | 2006146358 | 6/2006 |
| JP | 2009217373 | 9/2009 |
| JP | 2010146542 | 7/2010 |
| JP | 2011186849 | 9/2011 |
| JP | 2013228902 | 11/2013 |
| RU | 2450333 | 5/2012 |
| RU | 2488879 | 7/2013 |
| WO | WO2006111205 | 10/2006 |
| WO | WO2007053848 | 5/2007 |

OTHER PUBLICATIONS

Russian Search Report for Russian Application No. 2014131819/08(051143) dated Aug. 1, 2014. English translation not provided.

\* cited by examiner

SYSTEM AND METHOD FOR SECURING USE OF A PORTABLE DRIVE WITH A COMPUTER NETWORK

PRIOR APPLICATION

This application claims the benefit of Russian Federation Patent Application No. 2014131819 filed Aug. 1, 2014, the content of which is incorporated by reference herein.

FIELD OF THE INVENTION

The invention relates generally to information security and, more particularly, to computing systems and associated methods for managing the usability of portable drives with a computer network.

BACKGROUND OF THE INVENTION

The number and variety of computing devices used on, or with, privately-owned local area networks are rapidly growing. Along with computers and notebooks, smartphones, tablets and various other devices are used. Each device has a built-in data storage medium, and oftentimes can also support removable information storage media. In the present context, information storage media are referred to as drives. Drives can be connected to various computers and used for storing and transferring information. Almost every drive used within a corporate or other private computer network has confidential data which must be protected from being accessed outside of the network.

Ensuring protection of data when using drives is a task with many challenges and implications. In general, network administrators determine appropriate security policies for a drive or for a group of drives, to monitor the usage, to save the ownership history, to have the possibility to assign security policies for a device, and the like. Security policies can contain device access policies and encryption policies. Security policies can be assigned depending on various drive use criteria; for example, depending on who the owner is (i.e., to whom the drive was provided), in what network segment the drive is used, on what computers the drive is used, or what the drive type may be.

To date, a practical and comprehensive solution has not been proposed to secure portable drives in particular, which can be in the hands of different users and moved about within the network, and even outside of the network.

SUMMARY OF THE INVENTION

One aspect of the invention is directed to a system for securing use of a portable drive with a computer network. The system is based on a computing platform interfaced with the computer network, the computing platform including computing hardware of at least one processor, data storage, and input/output facilities, and an operating system implemented on the computing hardware. The system includes instructions that, when executed on the computing platform, cause the computing platform to implement a drive registration engine, a drive monitoring engine, a security policy determination engine, and a security policy enforcement engine.

The drive registration engine is configured to autonomously write and maintain a data store containing entries corresponding to a plurality of portable drives initialized for use with the computer network, each entry corresponding to at least one identifiable drive. The drive monitoring engine is operatively coupled with the drive registration engine and configured to autonomously monitor events occurring on the computer network involving use of each of the plurality of portable drives. The security policy determination engine is operatively coupled with the drive monitoring engine and configured to autonomously apply predefined security policy determination criteria, including drive mobility assessment criteria and drive content sensitivity criteria, to determine a drive-specific security policy for each one of the plurality of portable drives. The security policy enforcement engine is operatively coupled with the security policy determination engine, and configured to autonomously execute a set of at least one policy enforcement action corresponding to a determined drive-specific security policy in response to detected usage activity for each one of the plurality of portable drives.

In a related aspect, a machine-implemented method is provided for securing use of a portable drive with a computer network. The method is carried out autonomously by a computing platform. The method includes: writing and maintaining a data store containing entries corresponding to a plurality of portable drives initialized for use with the computer network, each entry corresponding to at least one identifiable drive; monitoring events occurring on the computer network involving use of each of the plurality of portable drives; applying predefined security policy determination criteria, including drive mobility assessment criteria and drive content sensitivity criteria, to determine a drive-specific security policy for each one of the plurality of portable drives; and executing a set of at least one policy enforcement action corresponding to a determined drive-specific security policy in response to detected usage activity for each one of the plurality of portable drives.

BRIEF DESCRIPTION OF THE DRAWINGS

The invention may be more completely understood in consideration of the following detailed description of various embodiments of the invention in connection with the accompanying drawings, in which.

Figure 1A:
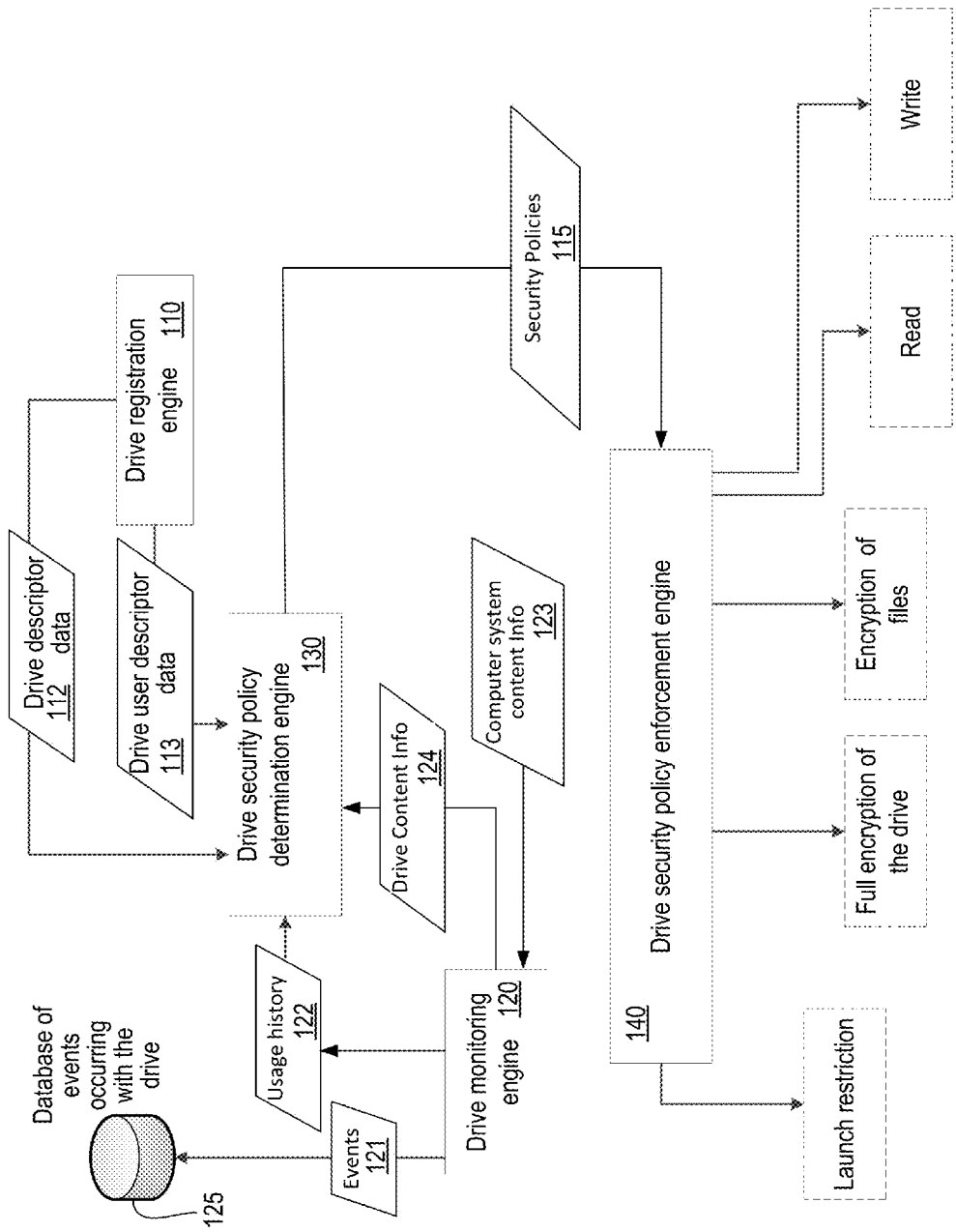
FIG. 1A is a system block diagram illustrating an exemplary structure of a system for controlling access to a drive on a network according to one embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

I Glossary

The following Glossary sets forth definitions of terms used herein. This Glossary is applicable to only the present Application.

"Computer," "Computer system," "Computing system," or "Computing platform"—an electronic device or system of inter-operable electronic devices containing hardware including one or more processors, data storage, input-output devices; and capable of storing and manipulating information according to software instructions carried out by the hardware. It can be one physical machine, or it can be distributed among multiple physical machines, such as by role or function, or by process thread in the case of a cloud computing distributed model. Examples include desktop or mobile personal computers (PCs), smartphones, and tablets, as well as networking devices, such as routers, switches, and the like. Computer systems can be stand-alone devices, or embedded devices that are part of a larger device or system.

"Drive"—a storage medium including, but not limited to, a flash drive (also commonly referred to as a universal serial bus (USB) key), an external hard disk drive (HDD), an external solid-state drive (SSD), an internal or rail-mounted HDD or SSD, a secure SD card, memory stick, or other such storage device, or an apparatus having a sharable and accessible storage medium that can be mounted to an operating system as a drive, such as a digital camera or smartphone, tablet, or the like.

"Data storage"—One or more electronic hardware devices that stores data in a physical storage medium. Examples include volatile storage (e.g., random-access memory (RAM), whether static or dynamic), non-volatile storage (e.g., electrically-erasable programmable read-only memory, magnetic disk, etc.).

"Data store"—A designated space in data storage containing a data structure.

"Input/output devices" or "Input/output facilities"—Electronic hardware part of a computer system that facilitate the flow of information into, and out of, the computer system. Examples include a network interface device, a monitor, a keyboard, a mouse, a printer, a serial port, etc.).

"Event"—An action or occurrence taking place in a computer system that is detectable by a monitoring process. Examples include the launching or closing of a program or data file, installation of an application program, connection of a drive, a user action (e.g., clicking a mouse button), receipt or creation of a file, system occurrences (e.g., memory violation) etc.

"Engine"—a real-world device, component, or arrangement of components implemented using hardware, or as a combination of hardware and software, such as by a microprocessor system and a set of program instructions that adapt the engine to implement the particular functionality, which (while being executed) transform the microprocessor system into a special-purpose device. A engine can also be implemented as a combination of the two, with certain functions facilitated by hardware alone, and other functions facilitated by a combination of software-controlled hardware. In certain implementations, at least a portion, and in some cases, all, of a engine can include the processor(s) of one or more computers that execute an operating system, system programs, and application programs, while also implementing the engine using multitasking, multithreading, distributed (e.g., cluster, peer-peer, cloud, etc.) processing where appropriate, or other such techniques. In addition, a engine can itself be composed of more than one sub-engines, each of which can be regarded as a engine in its own right.

"Processor"—Electronic hardware part of a computer system that carries out the instructions of a computer program by performing basic arithmetical, logical, temporary storage, and input/output operations of the system. Typically, a processor is implemented as a microprocessor (i.e., integrated on a single chip), though this definition includes processor circuits that are implemented on multiple interconnected integrated circuits. Modern-day processors typically include multiple processing cores and can distribute workload among the multiple processing cores.

"Security policy"—a set of rules defining security-related settings or actions to be made in response to the meeting of certain criteria. Examples of security policies can include application control rules, drive access monitoring rules, and drive encrypting rules. Examples of criteria that trigger a security policy to be established include usage criteria of a portable drive, e.g., a determination of mobility of a portable drive, and the sensitivity of content stored on the drive.

"Means for writing and maintaining a data store containing entries corresponding to a plurality of portable drives initialized for use with the computer network"—drive registration engine 110 according to any one (or combination of) its various embodiments described below, or any of its structural equivalents.

"Means for monitoring events occurring on the computer network involving use of each of the plurality of portable drives"—drive monitoring engine 120 according to any one (or combination of) its various embodiments described below, or any of its structural equivalents.

"Means for applying predefined security policy determination criteria, including drive mobility assessment criteria and drive content sensitivity criteria, to determine a drive-specific security policy for each one of the plurality of portable drives"—drive security policy determination engine 130 according to any one (or combination of) its various embodiments described below, or any of its structural equivalents.

"Means for executing a set of at least one policy enforcement action corresponding to a determined drive-specific security policy in response to detected usage activity for each one of the plurality of portable drives"—drive security policy enforcement engine 140 according to any one (or combination of) its various embodiments described below, or any of its structural equivalents.

II Description of Preferred Embodiments

Aspects of the invention are directed to creating and enforcing customized policies that govern the permissible use of a portable drive with a computer system or computer network. In the present context, a drive is defined as a storage medium including, but not limited to, a flash drive (also commonly referred to as a universal serial bus (USB) key), an external hard disk drive (HDD), an external solid-state drive (SSD), an internal or rail-mounted HDD or SSD, a secure SD card, memory stick, or other such storage device, or an apparatus having a sharable and accessible storage medium that can be mounted to an operating system as a drive, such as a digital camera or smartphone, tablet, or the like. In general, when a drive is operably coupled with a computer system, the computer system's operating system recognizes the drive as such, and would typically map the drive to one or more logical identifiers, such as an assigned letter for the drive, e.g., e:\, f:\, g:\, etc. Also, when operational, the drive would typically be formatted with a recognizable file system structure such as a file allocation table (e.g., FAT32, FAT32X), new technology file system (NTFS), or the like.

The computer system can be one physical machine, or can be distributed among multiple physical machines, such as by role or function, or by process thread in the case of a cloud computing distributed model. In various embodiments, aspects of the invention can be configured to run in virtual machines that in turn are executed on one or more physical machines. It will be understood by persons of skill in the art that features of the invention may be realized by a variety of different suitable machine implementations.

The system includes various engines, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

FIG. 1A is a system block diagram illustrating an exemplary structure of a system for controlling access to a drive on a network according to one embodiment. Drive registration engine 110 can be hosted by an individual server on the network, or distributed throughout a plurality of individual computer systems on the computer network. Drive registration engine 110 is programmed, or otherwise configured, to save drive descriptor data 112, such as the data containing each drive's unique ID, and user descriptor data 113, such as an ID of the drive's owner. The drive's ID can be any unique item or items of information about the drive, for example, its serial number, or the International Mobile Equipment Identity (IMEI). The owner's ID can be, for example, his/her login on a local area network, email address, a combination of first and last name, or other suitable data identifying the owner, or otherwise uniquely associated with the owner.

In addition, the drive registration engine 110 can save other drive descriptor data 112, such as drive's type, data about the network segments in which the drive is allowed to be used, or predefined security policies for the drive.

Security policies 115 include one or more policies such as encryption policies, device access control policies, or application control policies. The encryption policies determine whether to perform a full-drive encryption of a given drive, or to perform encryption of files of a certain type, etc. Device access control policies indicate a requirement for permissions for accessing the device; for instance, when it is permitted to read from the device or to write to it, or when both actions are forbidden.

The application control policies define the rules for use of the applications contained on the drive, for example, restricting the launch of all applications or restricting network activity of the application being launched.

The drive monitoring engine 120 can be implemented on a single network server in one embodiment, or distributed throughout a plurality of individual computer systems on the computer network in a related embodiment. In either of these possible implementations, the drive monitoring engine 120 is programmed, or otherwise configured, to detect occurring events 121 relating to usage of a drive, including such parameters as: the type of the operation performed using the drive; the result of the operation with the drive (for example, whether writing to the drive has been performed); the ID of the user performing actions with the drive; the computer on which the actions with the drive are performed; the network segment in which the actions with the drive are performed; compliance with the security policies for the drive (if the drive was encrypted using full-drive encrypting, it must have an encrypting container containing the encrypted information).

The drive monitoring engine 120 saves the detected drive usage events, updates the drive's usage history and sends the accumulated data to the drive security policy determination engine 130. In one embodiment, the drive monitoring engine 120 uses a database 125 for saving the accumulated history, which includes various data about the network computers being protected. When the drive is connected to a computer for the first time and for subsequent times, a related embodiment records status information relating to the computer system (for example, the type of operating system, how recent the operating system updates are, whether an anti-virus application is present and how recent the anti-virus databases are).

The drive security policy determination engine 130 can also be implemented on a single network server in one embodiment, or distributed throughout a plurality of individual computer systems on the computer network in a related embodiment. The drive security policy determination engine 130 is programmed, or otherwise configured, to determine the security policies applicable to the drive, based on the data from the drive registration engine and the drive usage history, as received from the drive monitoring engine 120, or as read from database 125. The security policies can include application control rules, drive access monitoring rules and drive encrypting rules.

The challenge of determining a suitable policy to be applied to drives used with the network involves striking a balance of meeting the needs of users while ensuring the security of data stored on the network. Accordingly, in one embodiment, drive security policy determination engine 130 applies a diverse set of criteria to assess (a) the mobility of each given drive, and (b) the sensitivity of the content stored on that drive. Since the values of these parameters can vary from one drive to another, assessment of these criteria allows the system to determine security policies in a flexible, dynamic manner.

In one example, the following factors are examined by drive security policy determination engine 130: various facts about users of the devices, information about the software installed on the devices, the nature of the hardware of the devices, the files stored on the devices, the location of the drive on the corporate local area network or outside of the network, at least one combination of two or more these factors.

In one embodiment, the usage history of the drive 122 is a set of factors that, collectively, are indicative of the mobility of the drive. Based on these factors, drive security policy determination engine 130 makes a conclusion as to whether the drive is used outside of the corporate local area network, in what segments of the corporate network the drive is located, etc. Usage location statistics are obtained, for example, by analyzing the computers and the access points to which the drive is connected, by using a subnet mask, or by using data from the drive's geolocation module, if one is available. If it is determined that the drive is moving (i.e., used in various locations), then the drive is considered to be mobile according to applied mobility criteria; otherwise, the drive is considered to be non-mobile.

In a related embodiment, the drive security policy determination engine 130 makes an inference to determine the usage history by analyzing the drive's hardware characteristics. For instance, the drive security policy determination engine 130 ascertains if the hardware corresponds to a photo camera or a telephone. In the affirmative case for either of these, drive security policy determination engine 130 infers that the device is mobile. The criteria of this group can, in one example embodiment, determine the following mobility type: the drive does not move, the drive moves inside a corporate network, the drive moves outside the corporate network.

Drive user descriptor data 113 represent a set of facts indicative of the owners of the drive or the people who temporarily use the drive for work. These criteria can indicate either a specific person or a certain group of users, for example, administrators, managers, executives, developers, etc.

The computer system content information 123 is a set of information which characterizes the software, running on a computer system with which a drive has interfaced, that has a role in operating the drive (e.g., operating system and its components, applications, microprograms, etc.). The computer system content information 123 can also indicate any groupings that the software may belong to, for example, gaming software, office applications, browsers, special-purpose software, etc. Special-purpose software in this example refers to a set of programs used to perform a certain class of tasks, for example, software for an automated process control system.

In one embodiment, a sensitivity criterion is implemented by drive security policy determination module 130. The sensitivity criterion can characterize the vulnerability of software, showing how much a certain software threatens the drive's security. In one particular example, the sensitivity criterion includes a software obsolescence determination that assesses an extent of obsolescence off a piece of software.

Another set of information that is notable is drive content information characterizing the files stored on the drive. These criteria take into account the type of the stored documents, their number, the security label of documents (a special mark indicating the degree of secrecy of the information contained in its media) or their confidentiality (whether the information contained in the document is publicly accessible or accessible by a limited group of people). The application of these criteria to a drive allows the system to generate an inference of the drive's purpose and its usage goals. For determining the confidentiality of the documents stored on a drive, in one embodiment, it is possible to use dictionary search methods, syntax-based analysis of document portions using a template, or digital print technologies. For determining the security label, in one embodiment, the same methods and technologies are used as for determining the confidentiality.

The drive security policy determination engine 130 is configured to analyze the above-described information. For example, in one of the embodiments, the drive security policy determination engine 130 determines whether the drive is connected to a computer on which confidential data are processed (for example, a server). This determination is made because the computer is located in a certain group. Consequently, the drive security policy determination engine 130, in one embodiment, determines that protected information can be written to the drive, which can ultimately lead to information leaks.

Figure 1B:
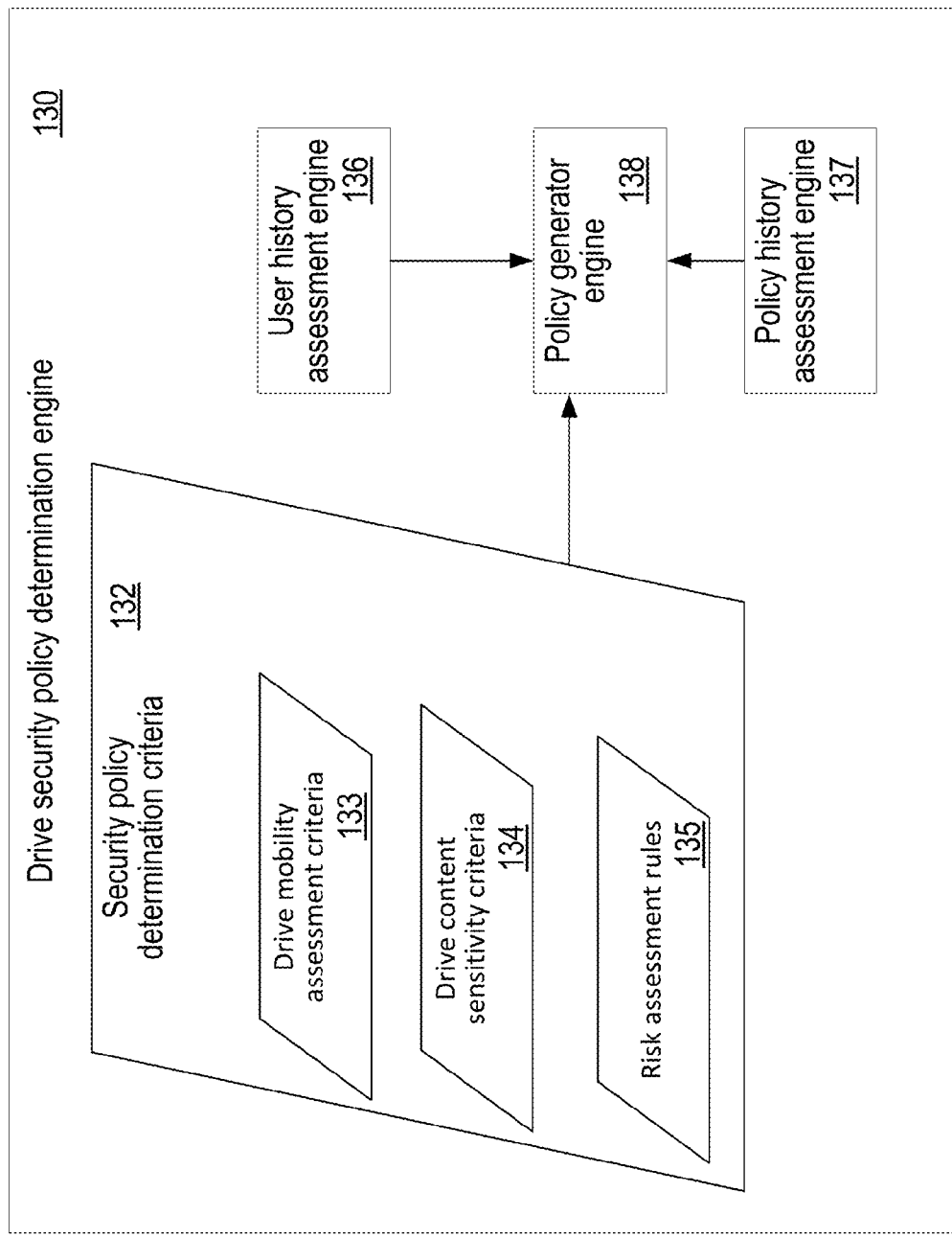
FIG. 1B is a block diagram illustrating drive security policy determination engine in according to one embodiment.

FIG. 1B is a block diagram illustrating drive security policy determination engine 130 in greater detail. The policy determination is ultimately made by policy generator engine 138. In order to generate the drive security policy, various criteria are applied. Some of these criteria are depicted as security policy determination criteria 132, which can include drive mobility assessment criteria 133, drive content sensitivity criteria 134, and risk assessment rules 135. Security policy determination criteria 132 defines how the usage history data 122, drive content information, and other information gathered and fed to drive security policy determination engine 130 is to be analyzed, and combined, to produce a risk assessment and policy parameters. Policy generator engine 138 reads security policy determination criteria 132 (which in one embodiment is predefined), and applies these criteria to the gathered information about the drive, the user, the drive's usage history, etc., to produce the policy to be associated with each analyzed drive.

In a related embodiment, user history assessment engine 136 applies user assessment criteria to information about the user of the drive, the user's position or function in the organization, the user's security-relevant reputation, and other gathered factors, to deduce or infer one or more risk assessments specific to the user. In another related embodiment, policy history assessment engine 137 applies policy history assessment criteria to produce a risk assessment based on past policy determinations specific to the drive, or specific to the user (e.g., pertaining to other drives associated with the user).

In one embodiment, policy generator engine 138 applies an algorithm that computes a series of numerical scores, each of which corresponds to a security policy parameter (e.g., launch restriction, full-drive encryption, partial drive encryption (of selected files), read privilege limitation, write privilege limitation). Each score can be assessed based on a computed degree of risk ascertained from the gathered device, usage history, and user information according to the security determination criteria 132. A variety of suitable algorithms are contemplated, including optionally utilizing artificial neural network and expert system algorithms.

Referring back to FIG. 1A, the system automatically enforces drive encryption policies utilizing drive security policy enforcement engine 140. Accordingly, in this embodiment, the system immediately narrows the drive's accessibility area using policies defining drive access restrictions, i.e., limited to the computers which are of a same or similar class to the computer to which the drive is currently connected (e.g., they are identified as being in the same group or perform the same functions, for example, server functions). The assignment of computers into a group can be previously made by a network administrator.

In a more advanced embodiment, policies are established not only at the moment the drive is connected to a computer, but also at the moment of an attempt to copy certain data to the drive.

In another embodiment, computers with confidential data are not obviously isolated into a separate group. But in this case the drive monitoring engine 120 determines that, on the computer to which the drive is connected, an application of a certain type is used. For example, a client for working with a bank, a document turnover application, a HR application. In this case, the system automatically makes a determination as to whether the drive security policy determination engine 130 needs or does not need to create additional security policies for the drive based on the information on what applications were launched on the computer during a specified period of time.

In yet another embodiment, by monitoring the drive relocation history, the system determines that the drive is connected to computers of a certain group. In this manner, the system creates a security policy blocking the use of the drive outside of this group, and assigns encrypting policies based on the information about the software used within this group.

In yet another embodiment, by using a user's drives history, it is possible to isolate security policies reflecting the accuracy and potential danger of the user. For example, according to the history data, the user has lost some drives. It is likely that the current drive will also be lost, therefore it makes sense to assign pre-emptive security policies at once, for example, to use encrypting. If the history contains data about infection of the drive with viruses, it is possible to determine security policies for monitoring applications, for example, to prohibit launch of any executable code for the drive.

It should be noted that drive-related events can include not only the events regarding the obvious use of the drive, but also data about what applications are installed and used on the computers to which the drive is connected, whether operating system updates are installed on the computers, how often the computer is infected by viruses, etc. For example, if the drive is regularly connected to computers without the latest security updates (there are no updates for the operating system, or the anti-virus application databases are obsolete), it is possible to make a conclusion on a higher probability of infection of the drive and to modify the policies for that drive to make them more strict.

The drive security policy determination engine 130 not only analyzes the history, but also has data about the previously adopted and implemented security policies. Based on these data, the drive security policy determination engine 130 can determine new security policies, using the previously determined policies. For example, some events occurred to the drive, which were recorded by the drive monitoring engine 120 and saved in the occurred events database. Based on the events, security restriction policies were built. After a certain time (for example, a week later), by examining the events log, the drive security policy determination engine 130 can determine whether certain policies had a positive effect or not. For example, the user constantly "infects" the drive with viruses. The drive security policy determination engine 130 determines the policies: to prohibit execution of the applications located on the drive, to prohibit connection of the drive to any computers except the owner's computer, to perform a full-disk encryption of the drive. If, with time, no viruses are detected on the drive, the drive security policy determination engine 130 determines that, after the application of the policies, the "infection" of the drive stopped, and consequently that the modification of the policies was effective and should be used in similar situations. In another embodiment, by using the previously adopted and implemented security policies, the drive security policy determination engine 130 determines the security policies progressively. For example, in case of occurrence of the above-described situation (the drive is "infected"), first the execution of applications is restricted, then connection to other computers is restricted, then the drive is encrypted. In this manner, it is possible to determine the more efficient set of policies for each individual case.

In one of the embodiments, the drive security policy determination engine 130 notifies a security officer. For example, if the drive security policy determination engine 130 exhausted all available policy modification measures, but a positive effect still did not occur. In this situation, it is necessary to inform the security officer, providing him with a report on what the problem with the specific drive is, and what policy restrictions have already been attempted automatically.

The drive security policy application engine 140, based on the rules from the drive security policy determination engine 130, applies drive use restrictions. The drive access monitoring rules regulate the possible read and write operations on the drive in general or for specific files. For example, writing of specific format files to photo camera type drives is forbidden in any network segment. Another example is that the drive is blocked in the system or on an individual computer, if the computer is located in a network segment where the use of the drive is not allowed. In addition, the drive security policy application engine 140 can clear data from the drive, for example, by performing a full or a quick formatting of the device.

In addition, the drive security policy application engine 140, based on the application control rules from the drive security policy determination engine 130, applies drive use restrictions. For example, launch of executable files from the drive in the specified segments of the network or in all segments of the network is forbidden.

Also, the drive security policy application engine 140, based on the encrypting policies from the drive security policy determination engine 130, performs encrypting on the device. Either full-disk encryption or encryption of individual files or specific format files can be applied.

Figure 2:
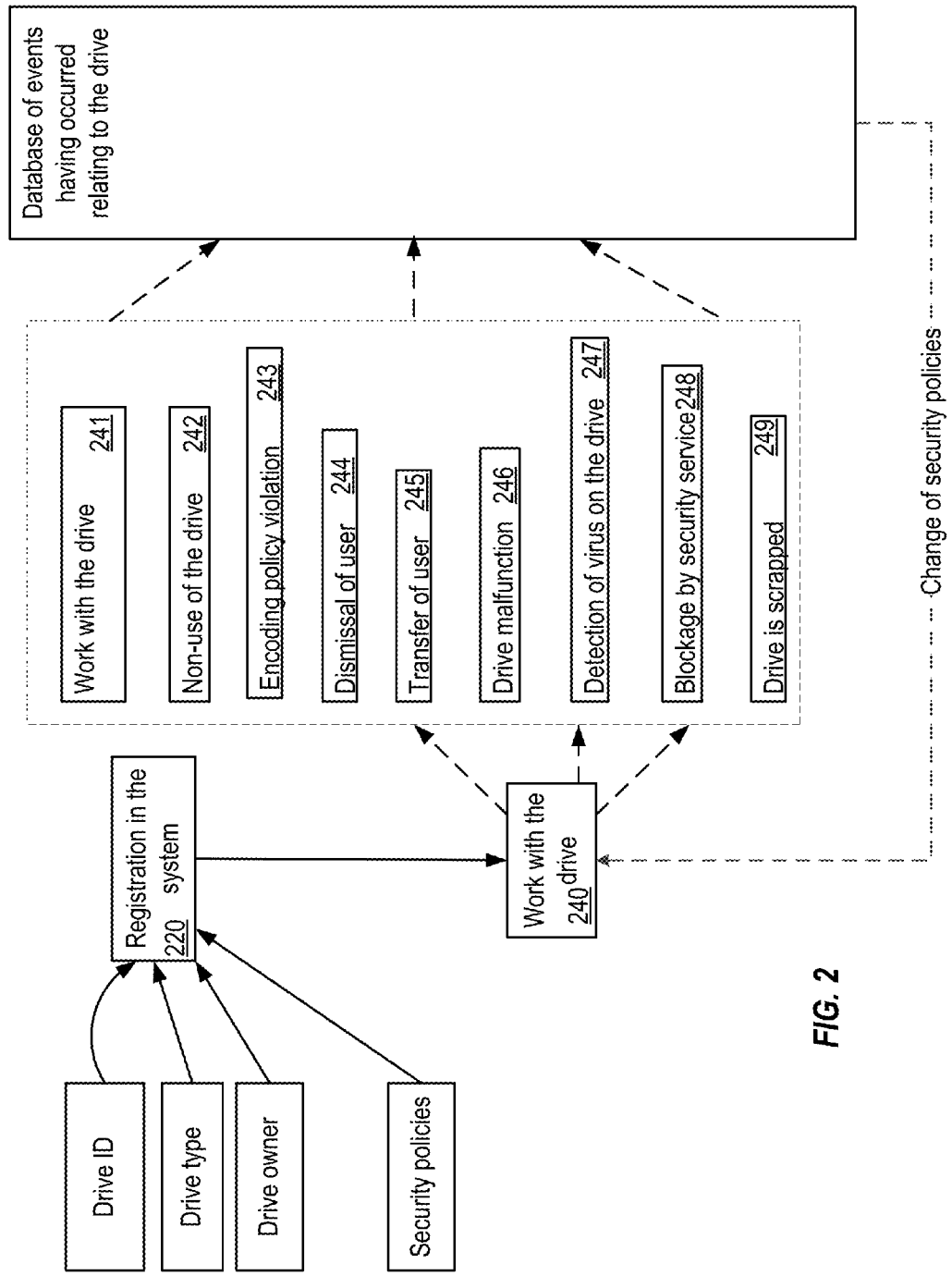
FIG. 2 is a process flow diagram illustrating a general case of determining security policies for a drive according to one example embodiment.

FIG. 2 is a process flow diagram illustrating a general case of determining security policies for a drive according to one example embodiment. At 220, the drive is registered in the system. The drive can appear in the system, for example, after being purchased. Initially, the drive is not issued to any of the employees; therefore it is registered in the system, for example, with a "New Drive" status. The owner of such drive can be, for example, a system account. For such a drive, rules are automatically built which order the drive security policy application engine to block any work with the drive. In this example, a requirement is established that requires the new drive to be initially cleared of all data, for example, using a quick formatting. Then, drive descriptor data are identified. This allows extending the functionality of the drive security policy determination engine in the system.

For example, consider the case where the drive properties indicate that the drive is a photo camera, a video camera or a voice recorder. This can be automatically recognized by the drive properties (for example, classification of the drive's driver, drive type, unique drive ID, drive manufacturer, drive hardware version, drive software version), and also can be specified manually, for example, the network administrator can modify the automatically determined type of the drive or specify the type if it was not determined automatically. The security policy determination engine will take this into account when creating encrypting engine policies for that device. If full-disk encryption or file encryption is used, the engine will stop functioning, because it will not recognize, for example, the file system or individual files on the drive being used. This is also important in the case if a global "encrypt all" policy is created for the security policy determination engine, because an exception will be automatically created for the specified devices. On the other hand, it is known that, for example, photographs and video files can be copied from a photo camera to a PC (in the general case, a specified set of file extensions) and can be deleted. It may not be possible to write data to a photo camera or launch executable files on a photo camera. Based on this, the system according to one embodiment creates rules for monitoring access to a drive and for monitoring applications. As a result, no matter who will receive the new device, the policies for the specific device will have priority over all permitted actions. Similarly, policies can also be specified for other types of devices (for example, for voice recorders, video cameras, dashboard cameras) which cannot be encrypted, but it is necessary to restrict the possibilities of working with them, thereby preventing data leaks. In the general case, during the registration of a drive, these data can be filled in automatically, provided that the drive registration engine will have a database for recognizing the type and functional purpose of the device.

Then, at 240, users begin their work with the drive. Two typical situations are exemplified herein for illustration: the drive becomes owned by an individual person, or by a department. At the moment when the owner is determined, a set of rules will be automatically created for the drive, intended for the drive security policy determination engine, which policies monitor the access to the drive (assuming that it is necessary to allow work with the drive to a specific employee or to all personnel of an assigned group), as well as a set of rules for monitoring applications and encrypting.

From the security point of view, it is possible to isolate a number of characteristic situations and scenarios that the system can process:

Connection of the drive to various PCs at a company 241: the monitoring engine saves the history of the events related to the drive. The history of events is important, for example, in case of internal investigations (it is possible to understand approximately how the drive moved on the network, or to build a group of potential security offenders in case of incidents).

The drive has not been used for a long time (i.e., exceeding a temporal threshold) 242: this indicates that the drive is either lost or not used. In the first case, it can be blocked by setting a suitable policy; in the second case, it is possible to notify the drive's owner, who can make a decision about returning the drive. If the drive monitoring engine records the date of the last connection and uses the total use frequency counter, the non-use of the drive can be easily recorded and the response can be automated. For example, if the drive has not been used for 3 months, or if the user reports that he/she cannot find the issued drive but is not sure that the drive is lost, then a "possibly lost" policy is entered in the system for the drive security policy determination engine, and rules are automatically generated for the drive access monitoring engine for blocking purposes, with a date and time stamp, and indication of the reason, "possibly lost drive". If the user finds the drive, then, when it is connected to the computer of the user to whom the drive was issued, the drive monitoring engine will recognize this action, and the security policy determination engine will automatically cancel the blockage-related policies.

In a related embodiment, in case of connection to a non-authorized computer (a computer whose user is not the drive's owner), the security policy determination engine blocks the use of the drive; after that, a warning can be sent to the security service. If the drive has not been used for 6 months, then, for example, for the drive's security policy determination engine, the "drive lost" status is entered, and rules are generated for blocking the lost drive. The drive is changed to the same status manually if the user reports its theft or loss. Any attempt of working with such a drive must be stopped in this case. In addition, for example, during blockage, it is possible to assign an additional policy "delete data at first connection". Such a policy can be created in automatic or manual mode (optionally), because if the drive was stolen and then re-appeared on the network, it is important to know what data are on the drive. If the drive was found (after having been lost for a long time), it can be unblocked. In case of connection to any computer on a network (to the owner's computer or to another user's computer), the drive monitoring engine generates a warning for the security service.

Breach of the encrypting policy 243: in the case where the drive monitoring engine finds that the encrypting container has been removed, the system according to one embodiment automatically creates an "encrypting policy breach" policy for the security policy determination engine; a warning is issued to the security service; a blocking rule with the "blockage due to encrypting policy breach" status is automatically created for the drive access monitoring engine. In another embodiment, the system automatically creates an "encrypting policy restoration" policy for the security policy determination engine, the device is cleared of data (formatted), and a full-disk encryption is applied to the drive.

Dismissal of the user 244: in this case, all drives issued to the user are usually returned. For example, the drive registration engine changes the drive's status to "New", clearing the data, or immediately recording that the drive was issued to another user, without deleting the data. If, for example, a dismissed user's drive is not presented to the system, it automatically moves to the "drive lost" status.

Transfer of the user to another position 245: in this situation, the drive's security policies will be different, and the information previously stored on the drive by the user cannot be used. In this case, for example, when recording a change of position, the system automatically corrects the policies for the user's drives, for example, it initiates their forced clearing. In another case, when being transferred, the user returns the drives similarly to the dismissal procedure.

Drive malfunction 246: in this situation, for example, the drive, using the drive's security policy determination engine, is given the "Blockage of failed drive" status, but without deletion from the drive registration engine's database, in order to save the drive usage history.

Detection of a virus on the drive 247: In this case, for example, it is possible to optionally block the drive with a special "blockage of infected drive" status and with the issue of a warning. This is important, for example, if the policies prohibit to move such drive outside the corporate network.

Blockage of the drive by the security service 248: For example, the drive is blocked with the "Blocked by security service" status; in addition, it may be necessary to have the possibility to block all drives of a specified user or a specified department.

The drive is scrapped regardless of its working condition 249: In this situation, destruction of the data is important and may be mandatory with saving of information by the drive monitoring engine, whether is it completed or not. After that, the drive receives the status "Blocked as written off", with building of a rule for the drive access monitoring engine, restricting its use.

It should be noted that the system can create reports using a report generator at status changes. For example, if the drive is issued to a user, a document is automatically printed, containing the drive's data, the date, and a place for the signature of the user who received the drive. Such document (its electronic version or image) can be entered in the system by the drive registration engine and can be bound to the drive. As long as the document is not in the system, no rules permitting the use of the drive are built. In case of an incident, a security specialist can immediately receive all documents allowing to involve the user in the investigation of the incident.

Another function that is possible in the exemplary system is the performance of a forced inventory check. For the specified drives (by the drive, by the user, by the user group, by the department), the drive's security policy determination engine turns on the "availability confirmation required" status. The users receive a request to confirm the fact that they have the drive. The confirmation is performed, for example, by connecting the drive to any computer on which its use is allowed. If the confirmation is performed within the specified period of time (for example, 10 days), the "availability confirmation required" status is removed, with the recording of the confirmation date and of the computer from which it was performed. Otherwise, the drive is automatically moved to the "possibly lost" status.

Figure 3:
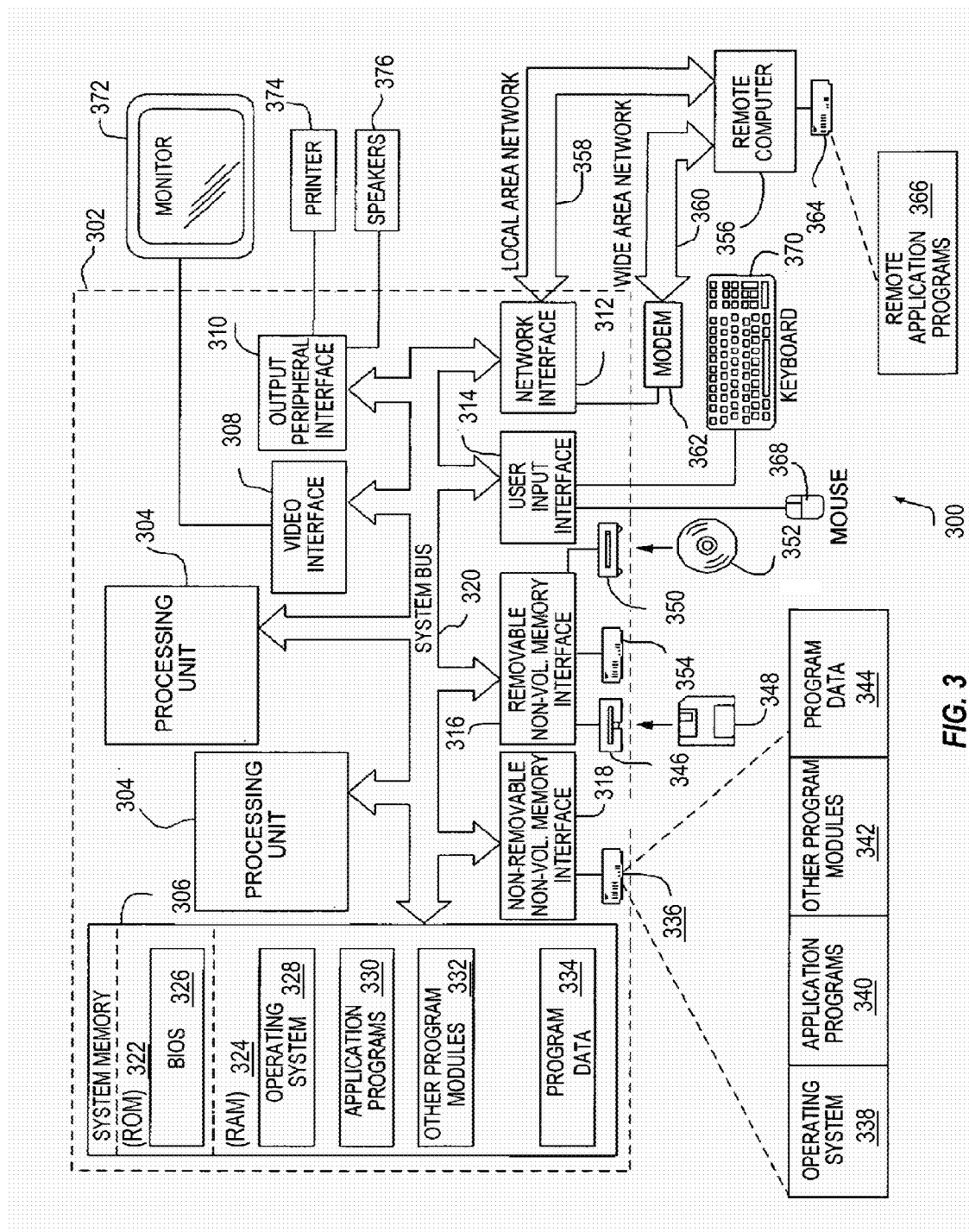
FIG. 3 is a diagram illustrating in greater detail a computer system on which aspects of the invention as described herein may be implemented according to various embodiments.

FIG. 3 is a diagram illustrating in greater detail a computer system 300 on which aspects of the invention as described herein may be implemented according to various embodiments. The computer system 300 may include a computing device such as a personal computer 302. The personal computer 302 includes one or more processing units 304, a system memory 306, a video interface 308, an output peripheral interface 310, a network interface 312, a user input interface 314, removable 316 and non-removable 318 memory interfaces and a system bus or high-speed communications channel 320 coupling the various components. In various embodiments, the processing units 304 may have multiple logical cores that are able to process information stored on computer readable media such as the system memory 306 or memory attached to the removable 316 and non-removable 318 memory interfaces 318. The computer 302 system memory 306 may include non-volatile memory such as Read Only Memory (ROM) 322 or volatile memory such as Random Access Memory (RAM) 324. The ROM 322 may include a basic input/output system (BIOS) 326 to help communicate with the other portion of the computer 302. The RAM 324 may store portions of various software applications such as the operating system 328, application programs 330 and other program engines 332. Further, the RAM 324 may store other information such as program or application data 334. In various embodiments, the RAM 324 stores information that requires low-latencies and efficient access, such as programs and data being manipulated or operated on. In various embodiments RAM 324 comprises Double Data Rate (DDR) memory, Error Correcting memory (ECC) or other memory technologies with varying latencies and configurations such as RAMBUS or DDR2 and DDR3. In this way, in various embodiments, the system memory 306 may store the input data store, access credential data store, operating memory data store, instruction set data store, analysis result data store and the operating memory data store. Further, in various embodiments, the processing units 304 may be configured to execute instructions that limit access to the aforementioned data stores by requiring access credential before access to the information is granted.

The removable 316 and non-removable 318 memory interfaces may couple the computer 302 to disk drives 336 such as SSD or rotational disk drives. These disk drives 336 may provide further storage for various software applications such as the operating system 338, application programs 340 and other program engines 342. Further, the disk drives 336 may store other information such as program or application data 344. In various embodiments, the disk drives 336 store information that doesn't require the same low-latencies as in other storage mediums. Further, the operating system 338, application program 340 data, program engines 342 and program or application data 344 may be the same information as that stored in the RAM 324 in various embodiments mentioned above or it may be different data potentially derivative of the RAM 324 stored data.

Further, the removable non-volatile memory interface 316 may couple the computer 302 to magnetic portable disk drives 346 that utilize magnetic media such as the floppy disk 348, Iomega® Zip or Jazz, or optical disk drives 350 that utilize optical media 352 for storage of computer readable media such as Blu-Ray®, DVD-R/RW, CD-R/RW and other similar formats. Still other embodiments utilize SSD or rotational disks housed in portable enclosures 54 to increase the capacity of removable memory.

The computer 302 may utilize the network interface 312 to communicate with one or more remote computers 356 over a local area network (LAN) 358 or a wide area network (WAN) 360. The network interface 312 may utilize a Network Interface Card (NIC) or other interface such as a modem 362 to enable communication. The modem 362 may enable communication over telephone lines, coaxial, fiber optic, powerline, or wirelessly. The remote computer 356 may contain a similar hardware and software configuration or may have a memory 364 that contains remote application programs 366 that may provide additional computer readable instructions to the computer 302. In various embodiments, the remote computer memory 364 can be utilized to store information such as identified file information that may be later downloaded to local system memory 306. Further, in various embodiments the remote computer 356 may be an application server, an administrative server, client computers, or a network appliance.

A user may enter information to the computer 302 using input devices connected to the user input interface 314 such as a mouse 368 and keyboard 370. Additionally, the input device may be a trackpad, fingerprint scanner, joystick, barcode scanner, media scanner or the like. The video interface 308 may provide visual information to a display such as a monitor 372. The video interface 308 may be an embedded interface or it may be a discrete interface. Further, the computer may utilize a plurality of video interfaces 308, network interfaces 312 and removable 316 and non-removable 318 interfaces in order to increase the flexibility in operation of the computer 302. Further, various embodiments utilize several monitors 372 and several video interfaces 308 to vary the performance and capabilities of the computer 302. Other computer interfaces may be included in computer 302 such as the output peripheral interface 310. This interface may be coupled to a printer 374 or speakers 376 or other peripherals to provide additional functionality to the computer 302.

Various alternative configurations and implementations of the computer 302 are within the spirit of the invention. These variations may include, without limitation, additional interfaces coupled to the system bus 320 such as universal serial bus (USB), printer port, game port, PCI bus, PCI Express or integrations of the various components described above into chipset components such as the northbridge or southbridge. For example, in various embodiments, the processing unit 304 may include an embedded memory controller (not shown) to enable more efficient transfer of data from the system memory 306 than the system bus 320 may provide.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A system for securing use of a portable drive with a computer network, the system comprising:
    a computing platform interfaced with the computer network, the computing platform including computing hardware of at least one processor, data storage, and input/output facilities, and an operating system implemented on the computing hardware; and
    instructions that, when executed on the computing platform, cause the computing platform to implement:
    a drive registration engine configured to autonomously write and maintain a data store containing entries corresponding to a plurality of portable drives initialized for use with the computer network, each entry corresponding to at least one identifiable drive, wherein the plurality of portable drives includes drives that, when disconnected from the computer network, are unable to enforce a security policy and are distinct from any computing device configurable to enforce a security policy;
    a drive monitoring engine operatively coupled with the drive registration engine and configured to autonomously monitor events occurring on the computer network involving use of each of the plurality of portable drives;
    a security policy determination engine operatively coupled with the drive monitoring engine and configured to autonomously apply predefined security policy determination criteria, including drive mobility assessment criteria indicative of the usage history of the portable drive such that a determination of whether the portable drive is mobile or non-mobile is made by the security policy determination engine and drive content sensitivity criteria indicative of the liability of the portable drive to vulnerabilities of software in a computer system with which the portable drive is interfaced is made by the security policy determination engine, to determine a drive-specific security policy for each one of the plurality of portable drives;
    a security policy enforcement engine operatively coupled with the security policy determination engine, and configured to autonomously execute a set of at least one policy enforcement action corresponding to a determined drive-specific security policy in response to detected usage activity for each one of the plurality of portable drives.

2. The system of claim 1, wherein the drive monitoring engine is configured to log at least one property pertaining to each monitored event selected from the group consisting of: a type of operation performed using each monitored drive, a result of each operation involving each monitored drive, information identifying users that performed each operation involving each monitored each drive; information identifying a computer on which the actions with the drive are performed, a network segment in which the actions with the drive are performed, compliance with established security policies corresponding to each drive, or any combination thereof.

3. The system of claim 1, wherein the set of at least one policy enforcement action includes an action selected from the group consisting of: application of an access restriction for a first drive based on the drive-specific security policy corresponding to the first drive, application of encryption to at least a portion of content stored on a first drive based on the drive-specific security policy corresponding to the first drive, removal of at least a portion of content stored on a first drive based on the drive-specific security policy corresponding to the first drive, or any combination thereof.

4. The system of claim 3, wherein the access restriction is applicable to a certain subset of computers on the computer network.

5. The system of claim 1, wherein the drive mobility assessment criteria includes criteria selected from the group consisting of: criteria for determining a likelihood of whether a given drive will be used outside of the computer network, criteria for determining a likelihood of whether a given drive will be used outside of a defined segment of the computer network, a usage history review algorithm that determines a scope of past locations of usage a given drive, an assessment of a type of portable device with which a given drive is associated, or any combination thereof.

6. The system of claim 1, wherein the drive content sensitivity criteria includes at least one set of criteria for assessing a type of application selected from the group consisting of: criteria for assessing a type of application that is active on a computer with which a given drive is interfaced, criteria for assessing a type of application that is installed on a computer with which a given drive is interfaced, or any combination thereof.

7. The system of claim 1, wherein the drive content sensitivity criteria includes criteria selected from the group consisting of: criteria for assessing a type of computer from which content is written to a given drive, criteria for assessing a type of data stored on a given drive, criteria for assessing a type of file stored on a computer from which files are copied to a given drive, or any combination thereof.

8. The system of claim 1, wherein the drive content sensitivity criteria includes criteria for assessing a degree of secrecy of a file stored on a computer from which files are copied to a given drive.

9. The system of claim 1, wherein the drive security policy determination engine includes a user history assessment engine that is configured to autonomously assess a security risk corresponding to a specific user associated with a given portable drive based on user assessment criteria.

10. The system of claim 9, wherein the user assessment criteria includes criteria that analyzes security-related history associated with a given user's use of any other portable drives previously used by that user.

11. A machine-implemented method for securing use of a portable drive with a computer network, the method being carried out autonomously by a computing platform, and comprising:
 writing and maintaining a data store containing entries corresponding to a plurality of portable drives initialized for use with the computer network, each entry corresponding to at least one identifiable drive, wherein the plurality of portable drives includes drives that, when disconnected from the computer network, are unable to enforce a security policy and are distinct from any computing device configurable to enforce a security policy;
 monitoring events occurring on the computer network involving use of each of the plurality of portable drives;
 applying predefined security policy determination criteria, including drive mobility assessment criteria indicative of the usage history of the portable drive such that a determination of whether the portable drive is mobile or non-mobile is made by the security policy determination engine and drive content sensitivity criteria indicative of the liability of the portable drive to vulnerabilities of software in a computer system with which the portable drive is interfaced is made by the security policy determination engine, to determine a drive-specific security policy for each one of the plurality of portable drives;
 executing a set of at least one policy enforcement action corresponding to a determined drive-specific security policy in response to detected usage activity for each one of the plurality of portable drives.

12. The method of claim 11, wherein the in monitoring the events, at least one property pertaining to each monitored event is logged, the at least one property selected from the group consisting of: a type of operation performed using each monitored drive, a result of each operation involving each monitored drive, information identifying users that performed each operation involving each monitored each drive; information identifying a computer on which the actions with the drive are performed, a network segment in which the actions with the drive are performed, compliance with established security policies corresponding to each drive, or any combination thereof.

13. The method of claim 11, wherein in executing the set of at least one policy enforcement action, an action is executed selected from the group consisting of: application of an access restriction for a first drive based on the drive-specific security policy corresponding to the first drive, application of encryption to at least a portion of content stored on a first drive based on the drive-specific security policy corresponding to the first drive, removal of at least a portion of content stored on a first drive based on the drive-specific security policy corresponding to the first drive, or any combination thereof.

14. The method of claim 13, wherein the access restriction is applicable to only a certain subset of computers on the computer network.

15. The method of claim 11, wherein in applying the predefined security policy determination criteria, the drive mobility assessment criteria applied includes criteria selected from the group consisting of: criteria for determining a likelihood of whether a given drive will be used outside of the computer network, criteria for determining a likelihood of whether a given drive will be used outside of a defined segment of the computer network, a usage history review algorithm that determines a scope of past locations of usage a given drive, an assessment of a type of portable device with which a given drive is associated, or any combination thereof.

16. The method of claim 11, wherein in applying the predefined security policy determination criteria, the drive content sensitivity criteria applied includes at least one set of criteria for assessing a type of application selected from the group consisting of: criteria for assessing a type of application that is active on a computer with which a given drive is interfaced, criteria for assessing a type of application that is installed on a computer with which a given drive is interfaced, or any combination thereof.

17. The method of claim 11, wherein in applying the predefined security policy determination criteria, the drive content sensitivity criteria applied includes criteria selected from the group consisting of: criteria for assessing a type of computer from which content is written to a given drive, criteria for assessing a type of data stored on a given drive, criteria for assessing a type of file stored on a computer from which files are copied to a given drive, or any combination thereof.

18. The method of claim 11, wherein in applying the predefined security policy determination criteria, the drive content sensitivity criteria applied includes criteria for assessing a degree of secrecy of a file stored on a computer from which files are copied to a given drive.

19. The method of claim 11, further comprising:
 autonomously assessing a security risk corresponding to a specific user associated with a given portable drive based on user assessment criteria.

20. The method of claim 19, wherein the user assessment criteria includes criteria that analyzes security-related history associated with a given user's use of any other portable drives previously used by that user.

21. A system for securing use of a portable drive with a computer network, the system being carried out autonomously by a computing platform, and comprising:

means for writing and maintaining a data store containing entries corresponding to a plurality of portable drives initialized for use with the computer network, each entry corresponding to at least one identifiable drive, wherein the plurality of portable drives includes drives that, when disconnected from the computer network, are unable to enforce a security policy and are distinct from any computing device configurable to enforce a security policy;

means for monitoring events occurring on the computer network involving use of each of the plurality of portable drives;

means for applying predefined security policy determination criteria, including drive mobility assessment criteria indicative of the usage history of the portable drive such that a determination of whether the portable drive is mobile or non-mobile is made by the security policy determination engine and drive content sensitivity criteria indicative of the liability of the portable drive to vulnerabilities of software in a computer system with which the portable drive is interfaced is made by the security policy determination engine, to determine a drive-specific security policy for each one of the plurality of portable drives;

means for executing a set of at least one policy enforcement action corresponding to a determined drive-specific security policy in response to detected usage activity for each one of the plurality of portable drives.

* * * * *